(12) United States Patent  
Suwabe

(10) Patent No.: US 7,343,318 B2
(45) Date of Patent: Mar. 11, 2008

(54) SHOP INFORMATION ADVERTISEMENT PANEL SYSTEM AND SHOP INFORMATION ADVERTISEMENT METHOD

(75) Inventor: Shinichi Suwabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1240 days.

(21) Appl. No.: 09/848,336

(22) Filed: May 4, 2001

(65) Prior Publication Data

US 2001/0040533 A1 Nov. 15, 2001

(30) Foreign Application Priority Data

May 10, 2000 (JP) .............................. 2000-142298

(51) Int. Cl.
*G06Q 30/00* (2006.01)
(52) U.S. Cl. ....................................................... 705/14
(58) Field of Classification Search .................. 705/14; 725/60
See application file for complete search history.

(56) References Cited

U.S. PATENT DOCUMENTS

| | | | | | |
|---|---|---|---|---|---|
| 5,451,998 | A | * | 9/1995 | Hamrick ...................... | 725/60 |
| 5,510,828 | A | * | 4/1996 | Lutterbach et al. ......... | 725/138 |
| 5,835,861 | A | * | 11/1998 | Whiteside ................... | 455/466 |
| 5,844,181 | A | * | 12/1998 | Amo et al. .................. | 187/396 |
| 5,848,129 | A | * | 12/1998 | Baker ......................... | 379/67.1 |
| 5,966,696 | A | * | 10/1999 | Giraud ........................ | 705/14 |
| 6,091,956 | A | * | 7/2000 | Hollenberg .............. | 455/456.5 |
| 6,879,285 | B2 | * | 4/2005 | Nobukiyo .............. | 342/357.09 |
| 2002/0055880 | A1 | * | 5/2002 | Unold et al. ................... | 705/26 |
| 2002/0056142 | A1 | * | 5/2002 | Redmond ................... | 725/151 |
| 2002/0094787 | A1 | * | 7/2002 | Avnet et al. .................. | 455/68 |
| 2002/0156858 | A1 | * | 10/2002 | Hunter ....................... | 709/207 |

FOREIGN PATENT DOCUMENTS

| | | | |
|---|---|---|---|
| JP | 5-233893 | 9/1993 | |
| JP | 9-160970 | 6/1997 | |
| JP | 10-232895 | 9/1998 | |
| JP | 10-240820 | 9/1998 | |
| WO | WO200157763 | * 9/2001 | .................. 705/14 |

OTHER PUBLICATIONS

Bruno, Antony. "Paging is reaching for new markets, new industries". Radio Comm Report. May 24, 1999. p. 18.*

* cited by examiner

*Primary Examiner*—Jeffrey D. Carlson
*Assistant Examiner*—Michael Bekerman
(74) *Attorney, Agent, or Firm*—Foley & Lardner LLP

(57) ABSTRACT

A shop information advertisement panel system in which, the respective shop terminals comprise an advertisement information registration requesting unit for requesting the advertisement panel control terminal to register advertisement information including image information expressing an advertisement image to be displayed on the advertisement panel device corresponding to its own shop terminal, through a communication network, the advertisement panel control terminal comprises an advertisement information controlling unit for registering and controlling the advertisement information for every shop terminal, based on a registration request of the advertisement information from the shop terminal, and sending the image information of the advertisement information to the advertisement panel device corresponding to the shop terminal, and the respective advertisement panel devices comprise an advertisement display unit for displaying an advertisement according to the image information sent from the advertisement panel control terminal.

18 Claims, 13 Drawing Sheets

FIG.14

RESTAURANT A    RESERVATION STATE DISPLAY  ⟨AT 17:20 ON MARCH 20⟩

3/31 (FRIDAY)

INPUT COLUMN OF THE RESERVATION
INDISPENSABLE ITEMS

| TIME | STATE | VACANCY | NAME | NUMBER OF PEOPLE | TEL |
|---|---|---|---|---|---|
| 17:00 - 19:00 | FULL | 0 | × | × | × |
| 19:00 - 21:00 | VACANCY | 10 | YAMADA | 4 | 00-XXXX-△△△△ |
| 21:00 - 23:00 | FULL | 0 | × | × | × |

4/1 (SATUADAY)    · · · · ·

MESSAGE DISPLAY COLUMN

[END] [SEND] [RE-DISPLAY]

SHOP INFORMATION ADVERTISEMENT PANEL SYSTEM AND SHOP INFORMATION ADVERTISEMENT METHOD

BACKGROUNDS OF THE INVENTION

1. Field of the Invention

The present invention relates to a shop information advertisement panel system for advertising a shop, and more particularly to a shop information advertisement panel system capable of easily updating an advertisement image to be displayed.

2. Description of the Related Art

Heretofore, an advertisement panel system provided with a display such as a CRT, LCD, or the like is usually set at a shop and at busy streets in front of a station or the like, to display the advertisement of the shop. The conventional advertisement panel system is designed in that image information expressing an advertisement image is stored in a memory installed therein, hence to display the advertisement image according to the content of the memory. Accordingly, in the case of changing the advertisement image, an advertiser has to go to the setting place of the advertisement panel so as to rewrite the content of the memory.

As mentioned above, in the case of changing an advertisement image, the conventional technique imposes a lot of burden on an advertiser because he or she must go to the setting place of the advertisement panel system and rewrite the memory content thereof, and this also disturbs immediate update of the advertisement image.

SUMMARY OF THE INVENTION

An object of the present invention is to provide a shop information advertisement panel system capable of updating an advertisement image quickly and lessening the burden of an advertiser.

Another object of the present invention is to provide a shop information panel system capable of displaying the content of an update advertisement on an advertisement panel system without imposing so much load on a communication network.

Further another object of the present invention is to provide a shop information advertisement panel system capable of presenting not only an advertisement image but also a detailed described map of a shop and detailed information such as reservation state to a user.

Another object of the present invention is to provide a shop information advertisement panel system capable of effective advertisement taking the focus on consumers comparatively in the neighborhood of a shop.

Another object of the present invention is to provide a shop information advertisement panel system in which an advertiser can obtain necessary information for the future commercial activities.

Further another object of the present invention is to provide a shop information advertisement panel system in which a user can make a reservation at ease.

According to the first aspect of the invention, a shop information advertisement panel system having a plurality of shop terminals provided in a shop, an advertisement panel control terminal for controlling an advertisement panel, connected with the respective shop terminals through a communication network, and a plurality of advertisement panel devices provided for every shop terminal for displaying an advertisement of the shop: wherein the respective shop terminals comprise an advertisement information registration requesting unit for requesting the advertisement panel control terminal to register advertisement information including image information expressing an advertisement image to be displayed on the advertisement panel device corresponding to its own shop terminal, through the communication network;

the advertisement panel control terminal comprises an advertisement information controlling unit for registering and controlling the advertisement information for every shop terminal, based on the registration request of the advertisement information from the shop terminal, and sending the image information of the advertisement information to the advertisement panel device corresponding to the above shop terminal; and the respective advertisement panel devices comprise an advertisement display unit for displaying an advertisement according to the image information sent from the advertisement panel control terminal.

In the preferred construction, the shop terminal comprising an advertisement information update requesting unit for requesting the advertisement panel control terminal to update the advertisement information corresponding to the shop terminal itself, which is registered in the advertisement panel control terminal, through the communication network; and the advertisement panel control terminal comprising an advertisement information registering unit of adding control information to the advertisement information requested to be registered by the shop terminal, so to register the both information therein, and an advertisement information updating unit for updating the advertisement information corresponding to the shop terminal having made an update request, of the advertisement information registered in an advertisement information storing unit, according to the update request of the advertisement information from the shop terminal.

In another preferred construction, the shop terminal sends the advertisement information including the image information and detailed information on the shop to the advertisement panel control terminal, so to request the same terminal to register the same information therein, the advertisement panel control terminal adds the control information including the information of the advertisement panel device corresponding to the shop terminal to the advertisement information sent from the shop terminal, so to register the both information for every shop terminal into the advertisement information registering unit.

According to the second aspect of the invention, a shop information advertisement panel system having a plurality of shop terminals provided in a shop, an advertisement panel control terminal for controlling an advertisement panel, connected with the respective shop terminals through a communication network, and a plurality of advertisement panel devices provided for every shop terminal for displaying an advertisement of the shop: wherein the respective shop terminals comprising an advertisement information registration requesting unit for requesting the advertisement panel control terminal to register advertisement information including image information expressing an advertisement image to be displayed on the advertisement panel device corresponding to its own shop terminal and detailed information on the shop where this shop terminal is provided, through the communication network;

the advertisement panel control terminal comprising an advertisement information controlling unit for registering and controlling the advertisement information for every shop terminal, based on the registration request of the advertisement information from the shop terminal, and sending the image information to the advertisement panel device corresponding to the shop terminal, and a detailed information referring unit for, when the advertisement panel device makes a reference request of the detailed information, sending the detailed information corresponding to the advertisement panel device making the reference request of the detailed information, of the registered advertisement information, to the advertisement panel device making the reference request; and the respective advertisement panel devices comprising an advertisement display unit for displaying an advertisement according to the image information sent from the advertisement panel control terminal, and a sending/receiving unit for portable unit for, upon receipt of a reference request of the detailed information from an information portable unit, issuing the reference request of the detailed information to the advertisement panel control terminal and sending the detailed information sent from the advertisement panel control terminal to the information portable unit, the information portable unit including a detailed information requesting unit for sending the reference request of the detailed information to the advertisement panel device according to a user's instruction, and displaying the received detailed information.

In the preferred construction, the shop terminal comprising an advertisement information update requesting unit for requesting the advertisement panel control terminal to update the advertisement information corresponding to the shop terminal itself, which is registered in the advertisement panel control terminal, through the communication network; and the advertisement panel control terminal comprising an advertisement information registering unit of adding control information to the advertisement information requested to be registered by the shop terminal so to register the both information therein, and an advertisement information updating unit for updating the advertisement information corresponding to the shop terminal having made an update request, of the advertisement information registered in an advertisement information storing unit, according to the update request of the advertisement information from the shop terminal.

In another preferred construction, the shop terminal sends the advertisement information including the image information and detailed information on the shop to the advertisement panel control terminal, so to request the same terminal to register the same information therein, the advertisement panel control terminal adds the control information including the information of the advertisement panel device corresponding to the shop terminal, to the advertisement information sent from the shop terminal, so to register the both information for every shop terminal into the advertisement information registering unit.

In another preferred construction, the detailed information consists of a plurality of items, the detailed information referring unit sends an item list of the detailed information corresponding to the advertisement panel device, of the registered detailed information, to the advertisement panel device having made a reference request when the reference request of the detailed information was made by the same advertisement panel device, and sends the content of an item corresponding to an item name to the advertisement panel device when the item name of the item list was notified by the same advertisement panel device, and the sending/receiving unit for portable unit issues a reference request of the detailed information to the advertisement panel control terminal, sends an item list to the information portable unit, upon receipt of the item list of the detailed information from the advertisement panel control terminal, notifies an item name to the detailed information referring unit, upon receipt of the item name from the information portable unit, and sends the content of an item sent from the detailed information referring unit to the information portable unit.

In another preferred construction, the detailed information requesting unit of the information portable unit sends a reference request of the detailed information to the advertisement panel device according to a user's instruction, displays an item list upon receipt of the item list of the detailed information, sends an item name of an item specified by a user to the advertisement panel device, and receives and displays the content of the item sent from the advertisement panel device.

In another preferred construction, the advertisement panel control terminal comprises an access history storing unit for storing an access history indicating access state of each item of the registered detailed information, and the detailed information referring unit updates the access history stored in the access history storing unit based on an item name notified from the advertisement panel device.

In another preferred construction, the detailed information includes reservation information indicating reservation state, the information portable unit comprises a reservation requesting unit for sending reservation requesting information to the advertisement panel device, the sending/receiving unit for portable unit sends the reservation requesting information to the advertisement panel control terminal, upon receipt of the reservation requesting information, the advertisement panel control terminal comprises a reservation request sending/receiving unit for sending the reservation requesting information sent from the sending/receiving unit for portable unit to the shop terminal corresponding to the advertisement panel device, and the shop terminal comprises a reservation controlling unit for controlling the reservation information indicating the reservation state and updating the reservation information based on the received reservation requesting information.

According to the third aspect of the invention, a shop information advertisement method in a shop information advertisement panel system having a plurality of shop terminals provided in a shop, an advertisement panel control terminal for controlling an advertisement panel, connected with the respective shop terminals through a communication network, and a plurality of advertisement panel devices provided for every shop terminal for displaying an advertisement of the shop, comprising the following steps of:

in the respective shop terminals, requesting the advertisement panel control terminal to register advertisement information including image information expressing an advertisement image to be displayed on the advertisement panel device corresponding to its own shop terminal, through the communication network;

in the advertisement panel control terminal, registering and controlling the advertisement information for every shop terminal, based on the registration request of the advertisement information from the shop terminal, and sending the image information of the advertisement information to the advertisement panel device corresponding to the above shop terminal; and in the respective advertisement panel devices, displaying an advertisement according to the image information sent from the advertisement panel control terminal.

In the preferred construction, the shop information advertisement method in a shop information advertisement panel system further comprising the following steps of:

in the shop terminal, requesting the advertisement panel control terminal to update the advertisement information corresponding to the shop terminal itself, which is registered in the advertisement panel control terminal, through the communication network; and in the advertisement panel control terminal, adding control information to the advertisement information requested to be registered by the shop terminal, so to register the both information therein, and updating the advertisement information corresponding to the shop terminal having made an update request, of the registered advertisement information, according to the update request of the advertisement information from the shop terminal.

In another preferred construction, the shop information advertisement method in a shop information advertisement panel system further comprising the following steps of:

in the shop terminal, sending the advertisement information including the image information and detailed information on the shop to the advertisement panel control terminal, so to request the same terminal to register the same information therein; and in the advertisement panel control terminal adding the control information including the information of the advertisement panel device corresponding to the shop terminal to the advertisement information sent from the shop terminal, so to register the both information for every shop terminal into the advertisement information registering unit.

According to another aspect of the invention, a shop information advertisement method in a shop information advertisement panel system having a plurality of shop terminals provided in a shop, an advertisement panel control terminal for controlling an advertisement panel, connected with the respective shop terminals through a communication network, and a plurality of advertisement panel devices provided for every shop terminal for displaying an advertisement of the shop, comprising the following steps of:

in the respective shop terminals, requesting the advertisement panel control terminal to register advertisement information including image information expressing an advertisement image to be displayed on the advertisement panel device corresponding to its own shop terminal and detailed information on the shop where this shop terminal is provided, through the communication network;

in the advertisement panel control, registering and controlling the advertisement information for every shop terminal, based on the registration request of the advertisement information from the shop terminal, and sending the image information to the advertisement panel device corresponding to the shop terminal, and when the advertisement panel device makes a reference request of the detailed information, sending the detailed information corresponding to the advertisement panel device having made the reference request to the detailed information, of the registered advertisement information, to the advertisement panel device having made the reference request; and in the respective advertisement panel devices, displaying an advertisement according to the image information sent from the advertisement panel control terminal, and upon receipt of a reference request of the detailed information from an information portable unit, issuing the reference request of the detailed information to the advertisement panel control terminal and sending the detailed information sent from the advertisement panel control terminal to the information portable unit.

In the preferred construction, the shop information advertisement method in a shop information advertisement panel system comprising the following steps of:

in the shop terminal, requesting the advertisement panel control terminal to update the advertisement information corresponding to the shop terminal itself, which is registered in the advertisement panel control terminal, through the communication network; and in the advertisement panel control terminal, adding control information to the advertisement information requested to be registered by the shop terminal so to register the both information, and updating the advertisement information corresponding to the shop terminal having made an update request, of the registered advertisement information, according to the update request of the advertisement information from the shop terminal.

In another preferred construction, the shop information advertisement method in a shop information advertisement panel comprising the following steps of:

in the shop terminal, sending the advertisement information including the image information and detailed information on the shop to the advertisement panel control terminal, so to request the same terminal to register the same information; and in the advertisement panel control terminal, adding the control information including the information of the advertisement panel device corresponding to the shop terminal, to the advertisement information sent from the shop terminal, so to register the both information for every shop terminal into the advertisement information registering unit.

In another preferred construction, the detailed information consists of a plurality of items, the advertisement panel control terminal sends an item list of the detailed information corresponding to the advertisement panel device, of the registered detailed information, to the advertisement panel device having made a reference request when the reference request of the detailed information was made by the same advertisement panel device, and sends the content of an item corresponding to an item name to the advertisement panel device when the item name of the item list was notified by the same advertisement panel device, and the advertisement panel device issues a reference request of the detailed information to the advertisement panel control terminal, sends an item list to the information portable unit, upon receipt of the item list of the detailed information from the advertisement panel control terminal, notifies an item name to the advertisement panel control terminal, upon receipt of the item name from the information portable unit, and sends the content of an item sent from the advertisement panel control terminal.

In another preferred construction, the information portable unit sends a reference request of the detailed information to the advertisement panel device, according to a user's instruction, displays an item list upon receipt of the item list of the detailed information, sends an item name of an item specified by a user to the advertisement panel device, and receives and displays the content of the item sent from the advertisement panel device.

In another preferred construction, the advertisement panel control terminal stores an access history indicating access state of each item of the registered detailed information, and updates the access history stored based on an item name notified from the advertisement panel device.

In another preferred construction, the detailed information includes reservation information indicating reservation state, the information portable unit sends reservation requesting information to the advertisement panel device, the advertisement panel device sends the reservation requesting information to the advertisement panel control terminal, upon receipt of the reservation requesting information, the advertisement panel control terminal sends the reservation requesting information sent from the advertisement panel device to the shop terminal corresponding to the advertisement panel device, and the shop terminal controls the reservation information indicating the reservation state and updates the reservation information based on the received reservation requesting information.

According to a further aspect of the invention, a computer readable memory storing a program for controlling a shop information advertisement in a shop information advertisement panel system having a plurality of shop terminals provided in a shop, an advertisement panel control terminal for controlling an advertisement panel, connected with the respective shop terminals through a communication network, and a plurality of advertisement panel devices provided for every shop terminal for displaying an advertisement of the shop:

the program of the respective shop terminals requesting the advertisement panel control terminal to register advertisement information including image information expressing an advertisement image to be displayed on the advertisement panel device corresponding to its own shop terminal, through the communication network;

the program of the advertisement panel control terminal registering and controlling the advertisement information for every shop terminal, based on the registration request of the advertisement information from the shop terminal, and sending the image information of the advertisement information to the advertisement panel device corresponding to the above shop terminal; and the program of the respective advertisement panel devices displaying an advertisement according to the image information sent from the advertisement panel control terminal.

According to a still further aspect of the invention, a computer readable memory storing a program for controlling a shop information advertisement in a shop information advertisement panel system having a plurality of shop terminals provided in a shop, an advertisement panel control terminal for controlling an advertisement panel, connected with the respective shop terminals through a communication network, and a plurality of advertisement panel devices provided for every shop terminal for displaying an advertisement of the shop:

the program of the respective shop terminals requesting the advertisement panel control terminal to register advertisement information including image information expressing an advertisement image to be displayed on the advertisement panel device corresponding to its own shop terminal and detailed information on the shop where this shop terminal is provided, through the communication network;

the program of the advertisement panel control terminal registering and controlling the advertisement information for every shop terminal, based on the registration request of the advertisement information from the shop terminal, and sending the image information to the advertisement panel device corresponding to the shop terminal, and when the advertisement panel device makes a reference request of the detailed information, sending the detailed information corresponding to the advertisement panel device having made the reference request of the detailed information, of the registered advertisement information, to the advertisement panel device having made the reference request; and the program of the respective advertisement panel devices displaying an advertisement according to the image information sent from the advertisement panel control terminal, and upon receipt of a reference request of the detailed information from an information portable unit, issuing the reference request of the detailed information to the advertisement panel control terminal and sending the detailed information sent from the advertisement panel control terminal to the information portable unit.

According to this invention, it is possible to register and update the image information through a communication network by using an advertisement information registration requesting unit and an advertisement information update requesting unit. Therefore, an advertiser doesn't need to go to a setting place of an advertisement panel system, which lessens the burden of an advertiser and enables quick update of an advertisement image.

According to this invention, when a user sends a reference request of the detailed information to an advertisement panel system displaying the user's interesting advertisement image, using an information portable unit, the reference request is sent to an advertisement panel control terminal through the advertisement panel system and the detailed information relative to the advertisement image is sent from the advertisement panel control terminal through the advertisement panel system, which enables the user to get the detailed information at ease.

Also, according to this invention, access history showing access state of each item of the detailed information is stored in an access history storing unit, which enables an advertiser to get useful and necessary information for the future commercial activities.

Also, according to this structure, when a user sends a reservation requesting information to an advertisement panel system showing an advertisement image of a shop the user wants to reserve, using an information portable unit, the reservation requesting information is sent to a shop terminal corresponding to the advertisement panel system through the advertisement panel system, an advertisement panel control terminal, and a communication network, which enables a user to make a reservation at ease.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 14 is a view showing an example of a reservation screen;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to not unnecessarily obscure the present invention.

Figure 1:
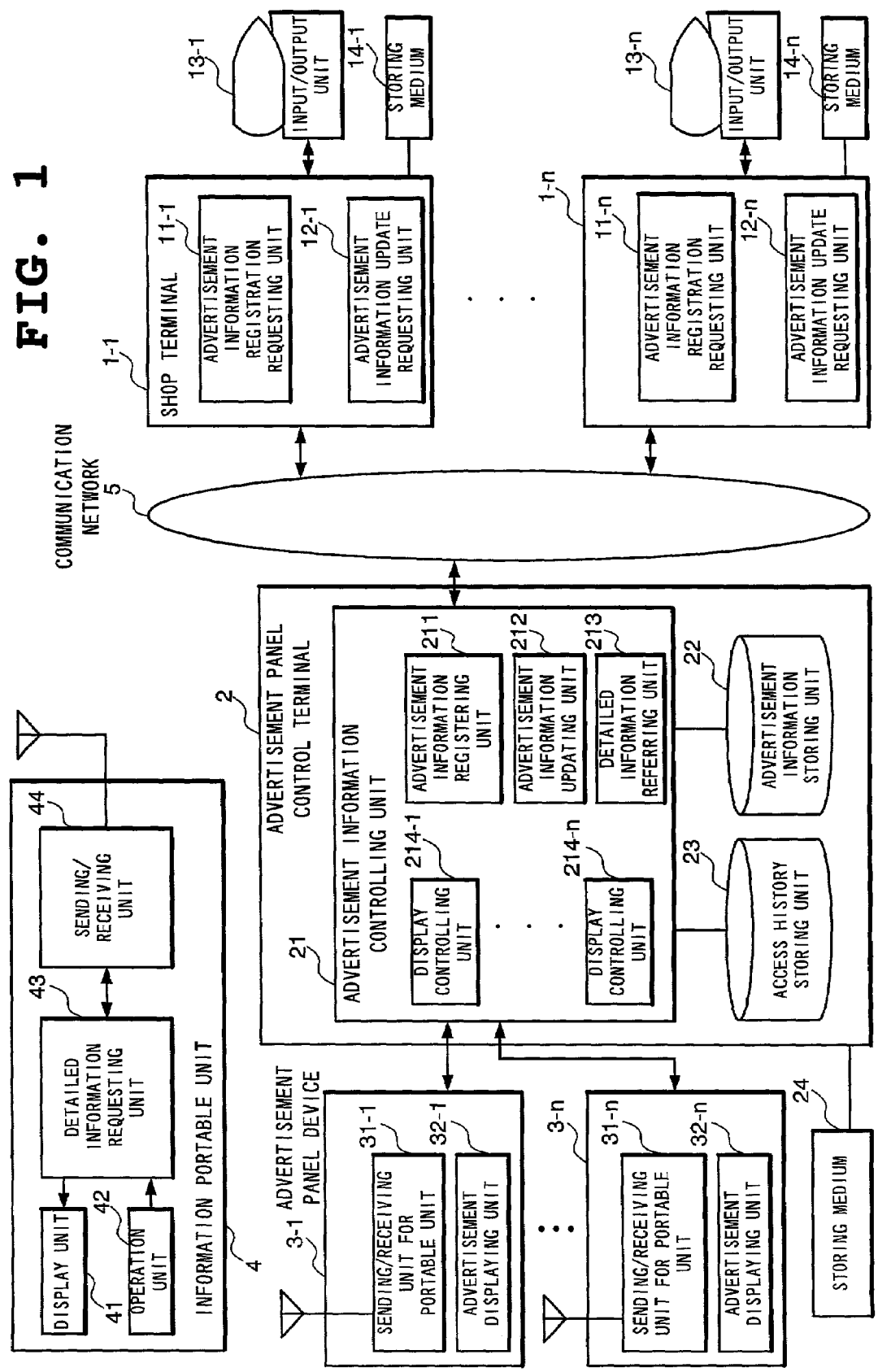
FIG. 1 is a block diagram showing a first embodiment of the present invention.

FIG. 1 is a block diagram showing a first embodiment of the present invention, which comprises a plurality of shop terminals 1-1 to 1-$n$, an advertisement panel control terminal 2, a plurality of advertisement panel systems 3-1 to 3-$n$ for the respective shop terminals 1-1 to 1-$n$, an information portable unit 4, a communication network 5 such as Internet for mutually connecting the shop terminals 1-1 to 1-$n$ with the advertisement panel control terminal 2.

The shop terminal 1-1 can be realized by a personal computer or the like set at a shop, which includes an advertisement information registration requesting unit 11-1, an advertisement information update requesting unit 12-1, an input/output unit 13-1 such as a key board and a CRT, and a storing medium 14-1. The other shop terminals have the identical structure, such that each shop terminal 1-$i$ includes an advertisement information registration requesting unit 11-$i$, an advertisement information update requesting unit 12-$i$, an input/output unit 13-$i$, and a storing medium 14-$i$, for (1<=i<=n).

The advertisement information registration requesting unit 11-1 has a function of requesting the advertisement panel control terminal 2 to register advertisement information through the communication network 5. The advertisement information includes image information expressing an advertisement image to be shown on the advertisement panel system 3-1 and detailed information to be shown on the information portable unit 4 carried by a user in reply to the request of the user. The image information includes, for example, exterior/interior image of a shop and images of handling goods. The detailed information includes various information on a plurality of items for introducing a shop in detail, such as map information showing the site of the shop, reservation information showing the state of reservation, and sale information showing the goods in the sale.

The advertisement information update requesting unit 12-1 has a function of requesting the advertisement panel control terminal 2 to update the advertisement information through the communication network 5.

The storing medium 14-1 is realized by a disk, a semiconductor memory, or the other storing medium, where a program for working a computer as the shop terminal 1-1 is stored. This program is read out by a computer, so to control the operation of the computer, thereby realizing the advertisement information registration requesting unit 11-1 and the advertisement information update requesting unit 12-1.

The advertisement panel control terminal 2 is realized by a computer or the like, which includes an advertisement information controlling unit 21, an advertisement information storing unit 22, an access history storing unit 23, and a storing medium 24.

The advertisement information controlling unit 21 includes an advertisement information registering unit 211, an advertisement information updating unit 212, a detail information referring unit 213, a plurality of display controlling unit 214-1 to 214-$n$ for the respective advertisement panel systems 3-1 to 3-$n$.

The advertisement information which the respective shop terminals 1-1 to 1-$n$ request to register is stored in the advertisement information storing unit 22.

The access history showing the access state of each item of the detailed information registered in the advertisement information storing unit 22 is stored in the access history storing unit 23.

The advertisement information registering unit 211 has a function of registering the advertisement information into the advertisement information storing unit 22 according to a registration request from the respective shop terminal 1-1 to 1-$n$.

The advertisement information updating unit 212 has a function of updating the advertisement information registered in the advertisement information storing unit 22, according to an update request from the respective shop terminals 1-1 to 1-$n$.

The detailed information referring unit 213 has a function of sending an item list of the detailed information of the shop terminal 1-*i* registered in the advertisement information storing unit 22 to the advertisement panel system 3-*i* (1≦i≦n), in reply to a reference request to the detailed information from the information portable unit 4, through the advertisement panel system 3-*i*, a function of sending the content of the item name, of the respective items of the detailed information of the shop terminal 1-*i*, in reply to an item name sent from the information portable unit 4 through the advertisement panel system 3-*i*, and a function of updating the access history stored in the access history storing unit 23, according to the item name notified from the advertisement panel system 3-*i*.

The respective display controlling unit 214-1 to 214-*n* have a function of sending the image information of the shop terminals 1-1 to 1-*n* registered in the advertisement information storing unit 22 to the respective advertisement panel systems 3-1 to 3-*n*.

The storing medium 24 is realized by a disk, a semiconductor memory, or the other storing medium, where a program for working a computer as the advertisement panel control terminal 2 is stored. This program is read out by the computer, so to control the operation of the computer, thereby realizing the advertisement information registering unit 211, the advertisement information updating unit 212, the detail information referring unit 213, and the display controlling unit 214-1 to 214-*n*.

The advertisement panel system 3-1 is to be set near a shop or at busy streets in front of a station, which includes a sending/receiving unit for portable unit 31-1 and an advertisement displaying unit 32-1. The other advertisement panel systems have the identical structure, such that an advertisement panel system 3-*i* includes a sending/receiving unit for portable unit 31-*i* and an advertisement displaying unit 32-*i*, for (1<=i<=n).

The sending/receiving unit for portable unit 31-1 has a function of sending the information sent from the information portable-unit 4 by wireless communication (electric waves and infrared rays) and sending the information sent from the advertisement panel control terminal 2 by wireless communication to the information portable unit 4.

The advertisement displaying unit 32-1 is realized by a CRT, LCD, or the like, which has a function of displaying an image according to the image information sent from the display controlling unit 214-1.

The information portable unit 4 includes a display unit 41 such as a LCD, an operation unit 42 formed by a touch panel and a key, a detailed information requesting unit 43, and a sending/receiving unit 44.

The sending/receiving unit 44 has a function of exchanging data with the advertisement panel system 3-*i* by wireless communication, for any i where (1<=i<=n).

The detailed information requesting unit 43 has a function of sending a detailed information reference request and an item name to the advertisement panel system through the sending/receiving unit 44, according to a user's instruction and a function of displaying the item list and the detailed information the sending/receiving unit 44 receives, on the display unit 41. The detailed information requesting unit 43 is realized by, for example, a micro processor and a storing medium such as a disk or a semiconductor memory storing a program for working the micro processor as the detailed information requesting unit 43. The program stored in the storing medium is read out by the micro processor, so to control the operation of the micro processor, thereby realizing the detailed information requesting unit 43 on the micro processor.

This time, the operation of the embodiment will be described.

The operation at a time of advertisement information registration will be described by taking an example of the case of registering the advertisement information from the shop terminal 1-1. An advertiser owning the shop terminal 1-1 activates the advertisement information registration requesting unit 11-1 by using the input/output unit 13-1, when registering the advertisement information.

Figure 2:
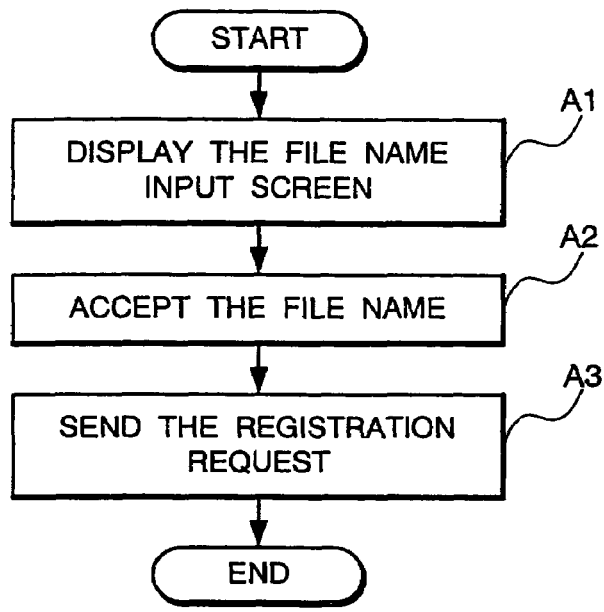
FIG. 2 is a flow chart showing a processing example of each advertisement information registration requesting unit 11-1 to 11-$n$.
Figure 3:
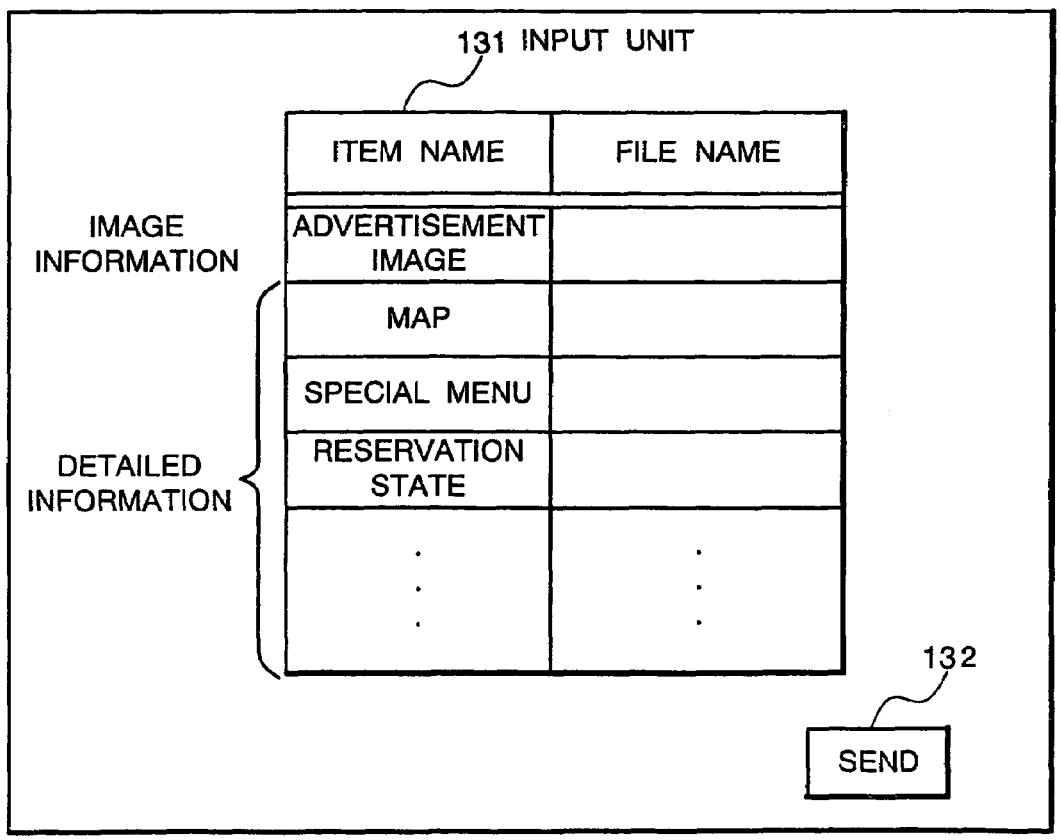
FIG. 3 is a view showing an example of a file name input screen.

The advertisement information registration requesting unit 11-1 displays an input screen of a file name on the input/output unit 13-1 (Step A1), as shown in the flow chart of FIG. 2. The file name input screen contains, for example, an input section 131 and a send button 132, as shown in FIG. 3. The input section 131 consists of several items such as showing image information (advertisement image) and showing each item of detailed information (map, special menu, etc.).

When the file name input screen as shown in FIG. 3 is displayed, an advertiser enters a file name of a file keeping image information and item information (a file existing within his or her own shop terminal 1-1) into an input column of a file name. For example, when the image information expressing an advertisement image is stored in a file named FA1, the "FA1" is input into the input column of the file name corresponding to the item name "advertisement image", when a map showing the site of a shop is stored in a file named FA2, the "FA2" is input into the input column of the file name corresponding to the item "map". When input of the file names is completed, the advertiser clicks the send button 132. It is not necessary to input a file name as for all the items established in the input section 131.

When the send button 132 is clicked, the advertisement information registration requesting unit 11-1 accepts all the file names established in the input section 131, and gets the information stored in the file having the same file name (Step A2). Then, it sends a registration request including the information obtained in Step A2 and the shop name where the shop terminal 1-1 is set (for example, "restaurant A"), to the advertisement panel control terminal 2 through the communication network 5 (Step A3). The corresponding item names are added to the respective information included in the registration request.

Figure 4:
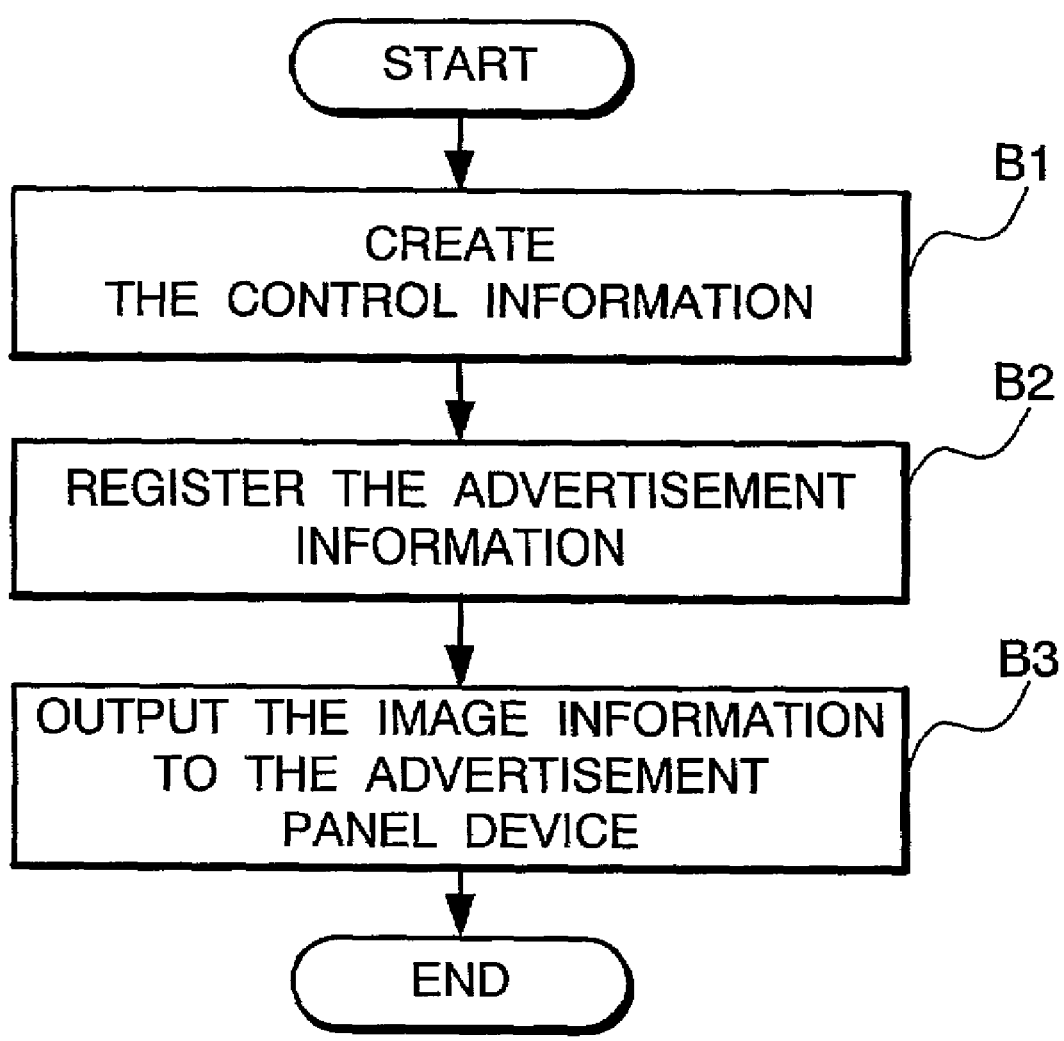
FIG. 4 is a flow chart showing a processing example of an advertisement information registration unit 211.

The advertisement information registering unit 211 within the advertisement panel control terminal 2 creates control information (Step B1 in FIG. 4), upon receipt of the registration request from the shop terminal 1-1. The control information includes the advertisement panel number "001" of the advertisement panel system 3-1 which is assigned to the shop terminal 1-1, the shop name "restaurant A" where the shop terminal 1-1 is set, the item names "advertisement image, map, special menu, reservation state, . . . ", included in the registration request, and the file names "IMG-001, MAP-001, SP-001, RSV-001, . . . " of the files storing the information corresponding to the above item names. Of the file names, a predetermined symbol for every item is defined in the portion before "-", and the advertisement panel number "001", of the advertisement panel system 3-1 which is assigned to the shop terminal 1-1 is set in the portion after "-".

Figure 5:
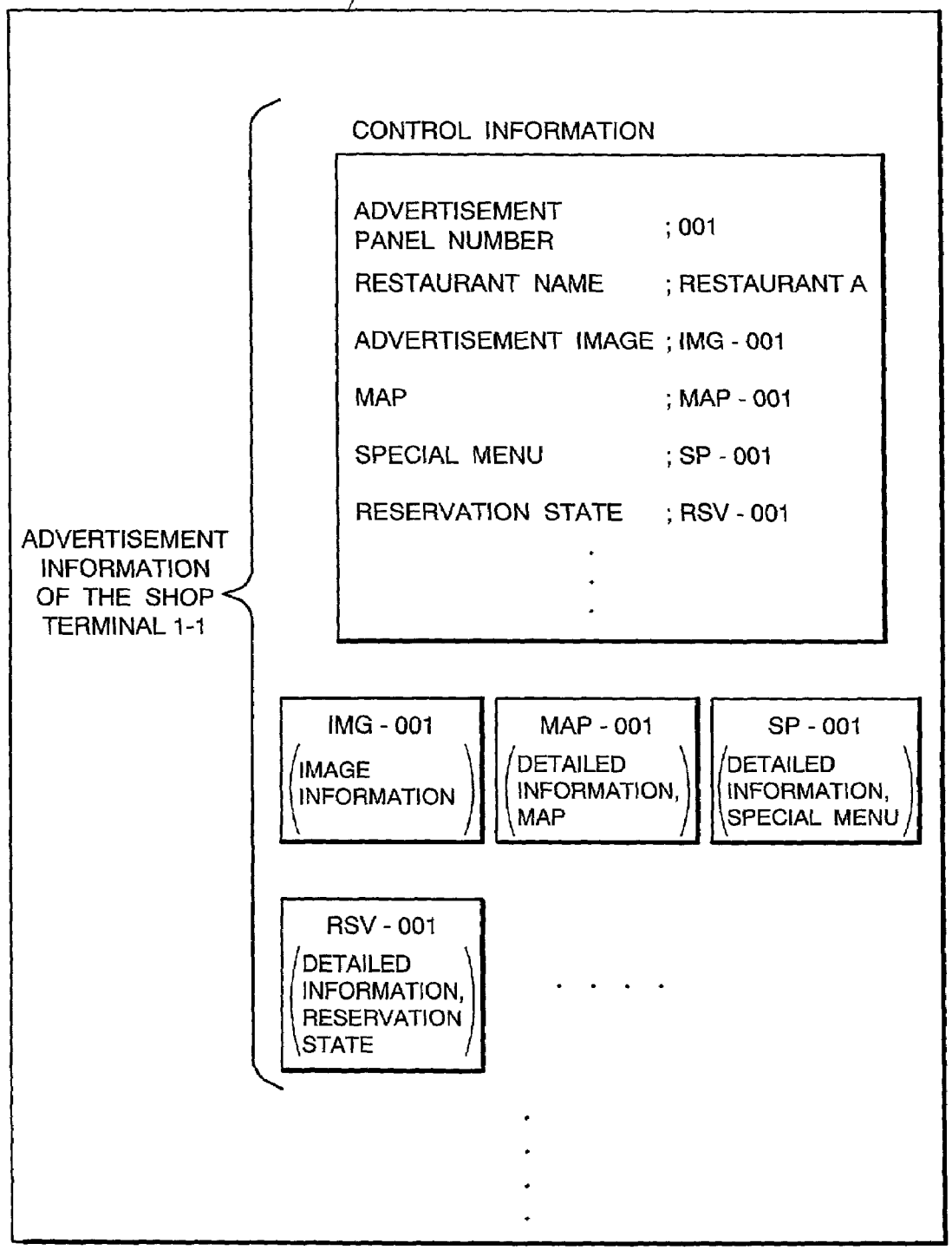
FIG. 5 is a view showing the content example of an advertisement information storing unit 22.

Then, the advertisement information registering unit 211 registers the advertisement information including the control information created in Step B1, the file "IMG-001" storing the image information, and the files "MAP-001", "SP-001", "RSV-001", storing the respective items of the detailed information, into the advertisement information storing unit 22, as shown in FIG. 5 (Step B2).

When the advertisement information of the shop terminal 1-1 is registered into the advertisement information storing unit 22, the display controlling unit 214-1 corresponding to the shop terminal 1-1 supplies the image information stored in the file "IMG-001" to the advertisement panel system 3-1 corresponding to the shop terminal 1-1 (Step B3). Thus, the advertisement displaying unit 32-1 within the advertisement panel system 3-1 displays an image according to the above image information.

This time, the operation at a time of advertisement information update will be described by taking an example of the case of updating the advertisement information on the side of the shop terminal 1-1. An advertiser owning the shop terminal 1-1 activates the advertisement information update requesting unit 12-1 by using the input/output unit 13-1 when updating the advertisement information.

Figure 6:
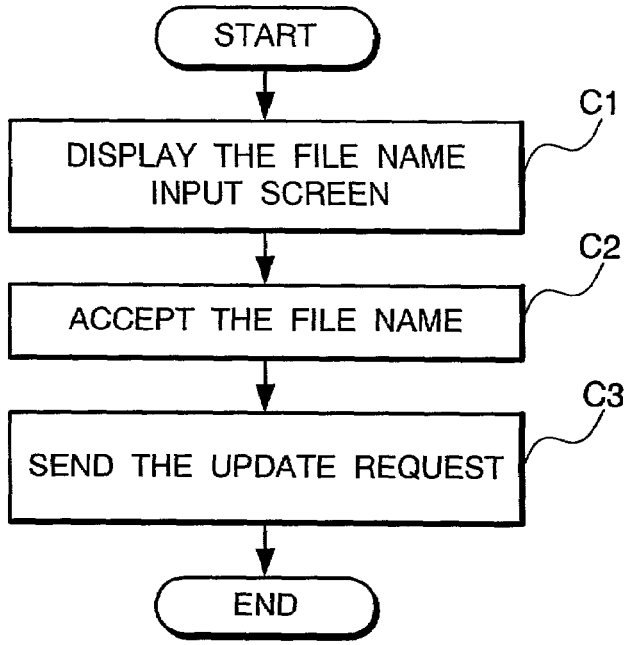
FIG. 6 is a flow chart showing a processing example of each advertisement information update requesting unit 12-1 to 12-$n$.

Thus, the advertisement information update requesting unit 12-1 displays the file name input screen on the input/output unit 13-1 (Step C1 in FIG. 6). This file name input screen has the structure as shown in FIG. 3.

When the file name input screen is displayed, an advertiser enters a file name of a file keeping the updated content, into an input column of the file name corresponding to the item to update the content. For example, when updating the content of the item "special menu" of the detailed information, he or she enters the file name of the file (for example, FA10) storing the updated special menu into the input column of the file name corresponding to the item name "special menu". When the input of the file name is completed, he or she clicks the send button 132.

Thus, the advertisement information update requesting unit 12-1 accepts all the file names set on the file name input screen and gets the information stored in the file having the corresponding file name (Step C2). In the case of this example, since the file name FA10 corresponding to the special menu is set on the file name input screen, the advertisement information updating unit 12-1 obtains the content of the file FA10.

Thereafter, the advertisement information update requesting unit 12-1 sends the update request including the content of the file FA10 obtained in Step C2 and the shop name "restaurant A" where the shop terminal 1-1 is set, to the advertisement panel control terminal 2 through the communication network 5 (Step C3). The corresponding item name "special menu" is added to the information included in the update request.

Figure 7:
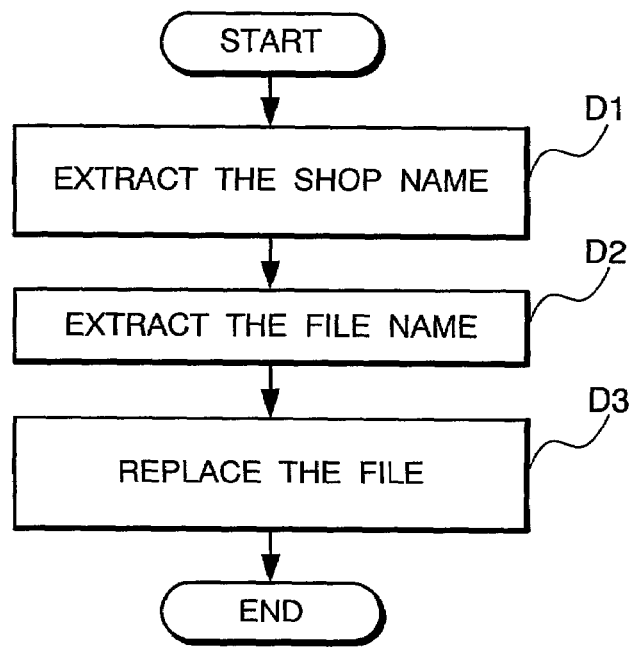
FIG. 7 is a flow chart showing a processing example of an advertisement information updating unit 212.

The advertisement information updating unit 212 within the advertisement panel control terminal 2 extracts the shop name "restaurant A" included in the update request, upon receipt of the update request from the shop terminal 1-1 (Step D1 in FIG. 7). Then, the advertisement information updating unit 212 retrieves the control information on the shop name "restaurant A" from the advertisement information storing unit 22, and extracts the file name corresponding to the item "special menu" from the retrieved control information (Step D2). Assuming that the control information is as shown in FIG. 5, for example, the file name "SP-001" will be extracted. The advertisement information updating unit 212 replaces the content of the file name "SP-001" with the information included in the update request (information relative to the special menu) (Step D3).

When the image information within the advertisement information is updated, the display controlling unit 214-1 supplies the updated image information to the advertisement panel system 3-1 as mentioned above (Step B3 in FIG. 4). The updated image information is displayed on the advertisement displaying unit 32-1 of the advertisement panel system 3-1.

This time, the operation when a user owning the information portable unit 4 refers to the detailed information will be described.

When a user sees an advertisement image displayed on the advertisement panel system (for example, the advertisement panel system 3-1) and wants to know the detailed information of the shop, the user directs the sending portion of electric waves and infrared rays of the information portable unit 4 to the advertisement panel 3-1 and presses the reference request button (not illustrated) provided on the operation unit 42.

Figure 8:
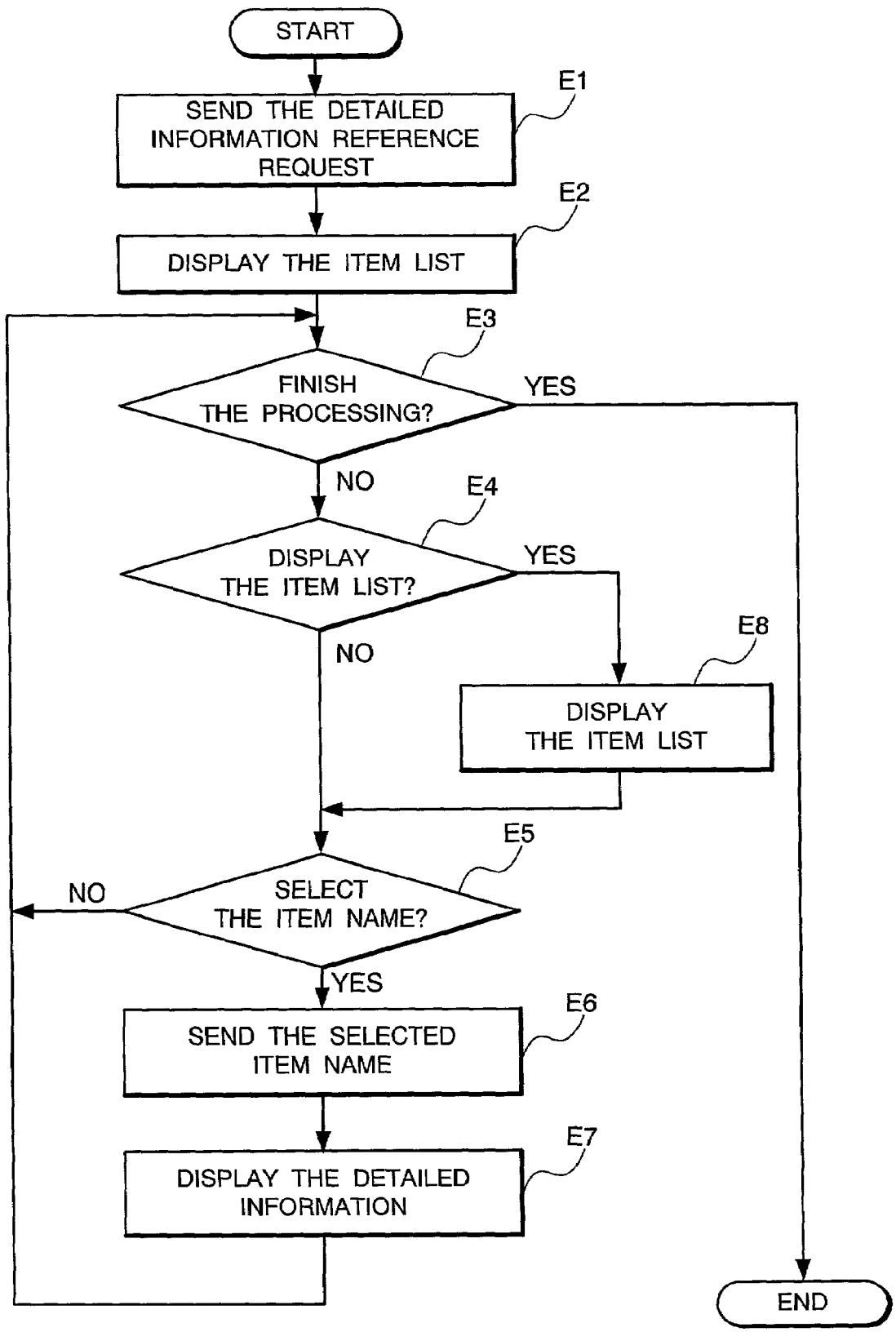
FIG. 8 is a flow chart showing a processing example of a detailed information requesting unit 43.

The detailed information requesting unit 43 within the information portable unit 4 supplies the detailed information reference request through the sending/receiving unit 44 (Step E1 in FIG. 8). Upon receipt of the detailed information reference request sent from the information portable unit 4, the sending/receiving unit for portable unit 31-1 within the advertisement panel system 3-1 adds the advertisement panel number "001" of itself to the same request, hence to pass it to the advertisement panel control terminal 2.

Figure 9:
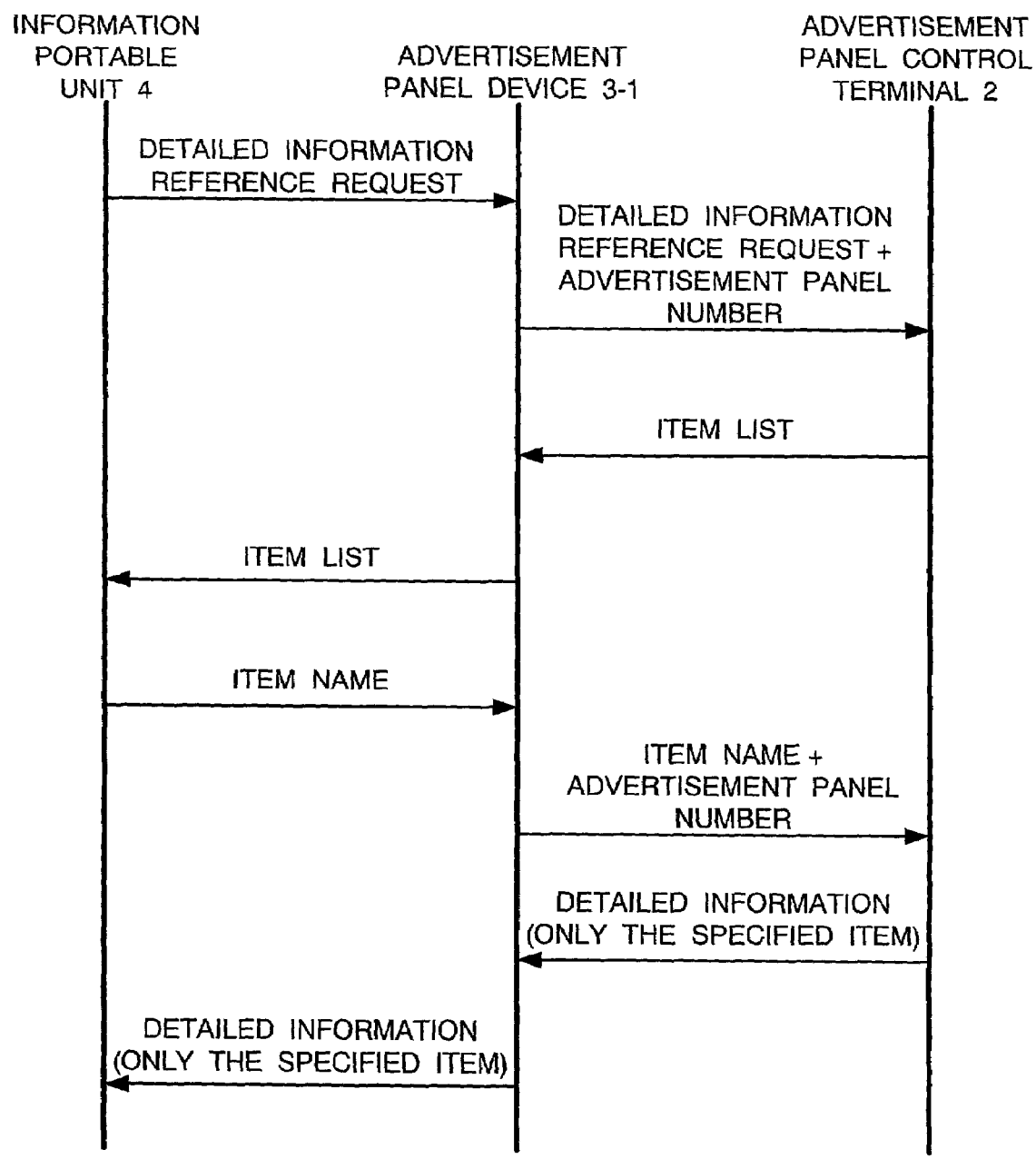
FIG. 9 is a view showing the information to be exchanged at a reference time to the detailed information.
Figure 10:
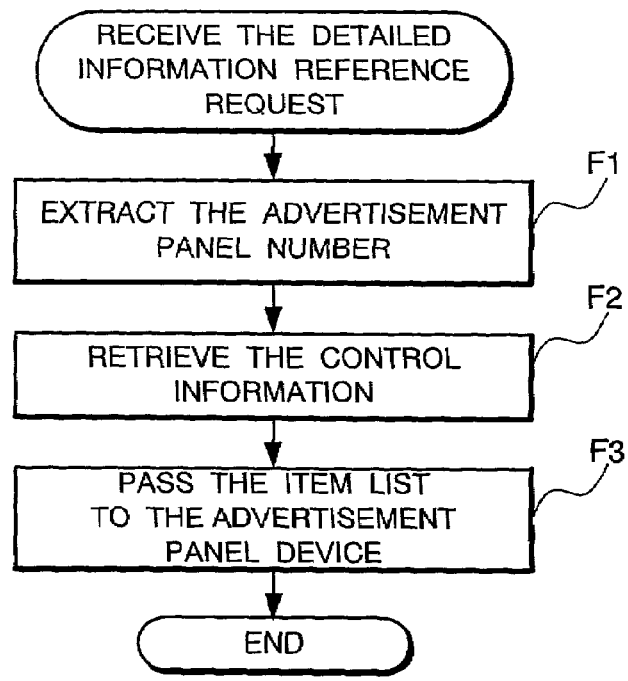
FIG. 10 is a flow chart showing a processing example of a detailed information referring unit 213.

Upon receipt of the detailed information reference request with the advertisement panel number "001" added there, the detailed information referring unit 213 within the advertisement panel control terminal 2 extracts the added advertisement panel number "001" (Step F1 in FIG. 10). Then, the detailed information referring unit 213 retrieves the control information on the advertisement panel number "001" from the advertisement information storing unit 22 (Step F2). When it found the control information on the advertisement panel number "001", it creates an item list based on the content and returns it to the advertisement panel system 3-1 (Step F3). For example, assuming that the control information as shown in FIG. 5 has been found in Step F2, it will return the item list including the item names "map, special menu, reservation state, . . . " to the advertisement panel system 3-1, in Step F3. This item list is sent to the information portable unit 4 through the sending/receiving unit for portable unit 31-1 within the advertisement panel system 3-1 as shown in FIG. 9.

When the sending/receiving unit 44 receives the item list, the detailed information requesting unit 43 within the information portable unit 4 displays it on the display unit 41 (Step E2 in FIG. 8).

When the item list is displayed on the display unit 41, a user selects an item name of an item he or she wants to refer to therefrom. For example, assuming that the item name "map" is selected (YES in Step E5), the detailed information requesting unit 43 sends the selected item name "map" to the advertisement panel system through the sending/receiving unit 44, hence into a wait state of receiving the detailed information (Step E6).

Upon receipt of the item name "map" sent from the information portable unit 4, as shown in FIG. 9, the sending/receiving unit for portable unit 31-1 within the advertisement panel system 3-1 adds the advertisement panel name "001" to the item name "map", hence to pass it to the advertisement control terminal 2.

Figure 11:
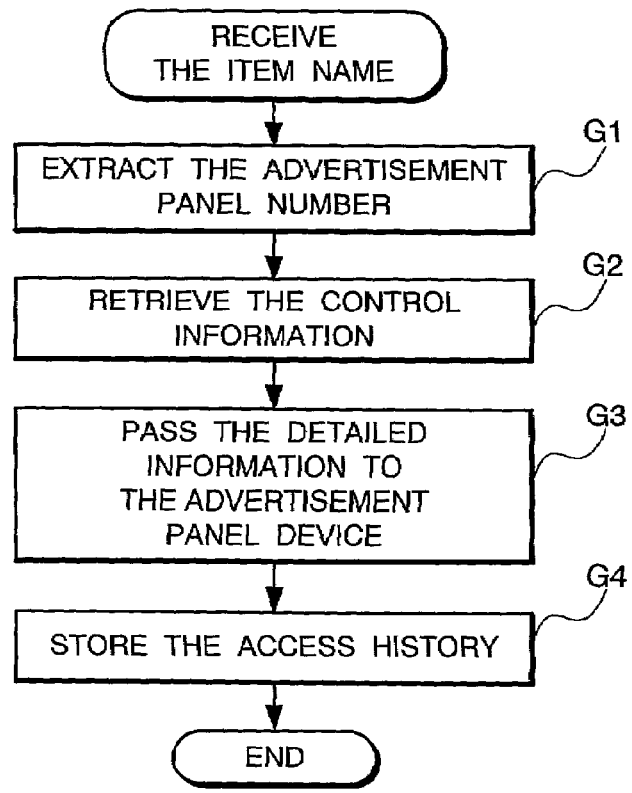
FIG. 11 is a flow chart showing another processing example of the detailed information referring unit 213.

When the item name "map" with the advertisement panel number "001" added there is sent from the advertisement panel system 3-1, the detailed information referring unit 213 within the advertisement panel control terminal 2 extracts the advertisement panel number "001" at first, as shown in the flow chart of FIG. 11, and retrieves the control information on the advertisement panel number "001", from the advertisement information storing unit 22 (Steps G1, G2). Based on the retrieved control information, it requires the file name "MAP-001" of the file storing the information on the item name "map", passes the content of the file to the advertisement panel system 3-1 as the detailed information, and registers a set of the item name "map" of the accessed detailed information, the access time, and the shop name of the shop where the accessed detailed information is registered, into the access history information storing unit 23 (Steps G3, G4).

Upon receipt of the detailed information (map), the sending/receiving unit for portable unit 31-1 within the advertisement panel system 3-1 sends it to the information portable unit 4.

When the sending/receiving unit 44 receives the detailed information (map), the detailed information requesting unit 43 within the information portable unit 4 displays it on the display unit 41 (Step E7 in FIG. 8). When a user wants to refer to the other item of the detailed information, he or she instructs the detailed information requesting unit 43 to display the item list again by using the operation unit 42. Thus, the detailed information requesting unit 43 displays the item list on the display unit 41 (YES in Step E4, Step E8). When finishing the reference to the detailed information, he or she operates the operation unit 42 so as to instruct the detailed information requesting unit 43 to finish the processing. Thus (YES in Step E3), the detailed information requesting unit 43 will finish the processing.

A second embodiment of the present invention will be described this time.

Figure 12:
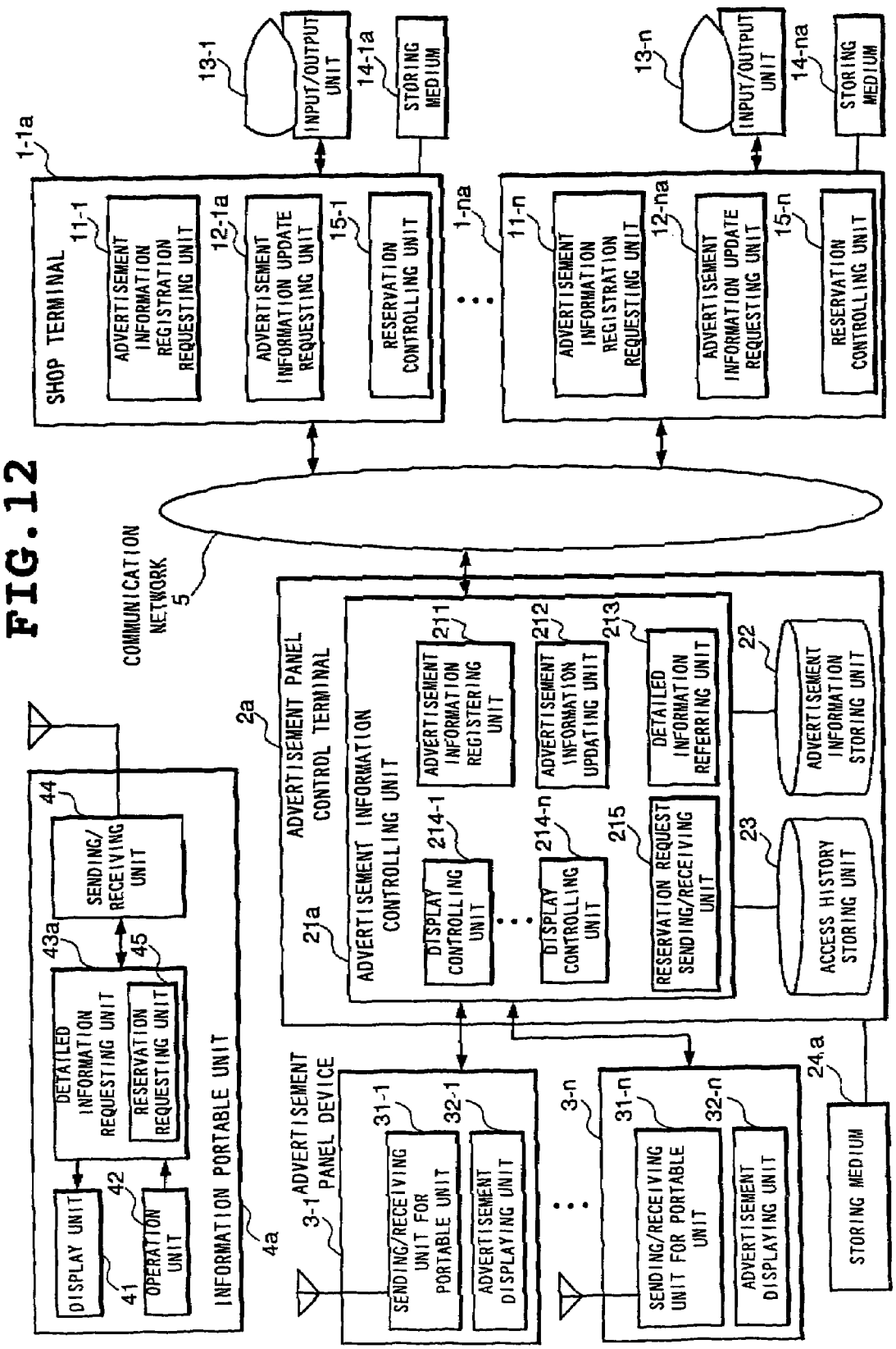
FIG. 12 is a block diagram showing a second processing example of the present invention.

FIG. 12 is a block diagram showing the second embodiment of the present invention, which comprises a plurality of shop terminals 1-1*a* to 1-*na*, an advertisement panel control terminal 2*a*, a plurality of advertisement panel systems 3-1 to 3-*n* for the respective shop terminals 1-1*a* to 1-*na*, an information portable unit 4*a*, a communication network 5 for mutually connecting the shop terminals 1-1*a* to 1-*na* with the advertisement panel control terminal 2*a*.

The shop terminal 1-1*a* of this embodiment is different from the shop terminal 1-1 of the first embodiment shown in FIG. 1 in that this embodiment is provided with the advertisement information update requesting unit 12-1*a* instead of the advertisement information update requesting unit 12-1 and a storing medium 14-1*a* instead of the storing medium 14-1, and further with a reservation controlling unit 15-1 additionally. The other shop terminals 1-*ia* have a similar structure to the shop terminal 1-1*a*, such that each shop terminal 1-*ia* is provided with an advertisement information update requesting unit 12-*ia* a storing medium 14-*ia*, and a reservation controlling unit 15-*i*, for (1<=i<=n).

The advertisement information update requesting unit 12-1*a* has a function of sending an update request of reservation information to the advertisement panel control terminal 2*a* when receiving the instruction from the reservation controlling unit 15-1, in addition to the function of the advertisement information update requesting unit 12-1 shown in FIG. 1.

The reservation controlling unit 15-1 has a function of controlling the reservation information indicating the reservation state stored in a reservation information file (not illustrated) within the own shop terminal 1-1*a*, a function of updating the reservation information stored in the reservation information file based on the reservation requesting information sent through the communication network 5, and a function of instructing the advertisement information update requesting unit 12-1*a* to make an update request of the reservation information at updating of the reservation information.

The storing medium 14-1*a* is realized by a disk, a semiconductor memory, and the other storing medium, where a program for working a computer as the shop terminal 1-1*a* is stored. This program is read out by the computer, so to control the operation of the computer, thereby realizing the advertisement information registration requesting unit 11-1, the advertisement information update requesting unit 12-1*a*, and the reservation controlling unit 15-1 on the computer.

The advertisement panel control terminal 2*a* is different from the advertisement panel control terminal 2 shown in FIG. 1 in that it is provided with the advertisement information controlling unit 21*a* having the reservation request sending/receiving unit 215 additionally, instead of the advertisement information controlling unit 21, and with the storing medium 24*a* instead of the storing medium 24.

The reservation request sending/receiving unit 215 has a function of sending reservation request information sent from the information portable unit 4*a* through the advertisement panel system 3-*i* (1≦i≦n), to the shop terminal 1-*ia* through the communication network 5 and a function of sending a reservation complete message and an error message sent from the shop terminal 1-*ia*, to the information portable unit 4*a* through the advertisement panel system 3-*i*.

The storing medium 24*a* is realized by a disk, a semiconductor memory, or the other storing medium, where a program for working a computer as the advertisement panel control terminal 2*a* is stored. This program is read out by the computer, so to control the operation of the computer, thereby realizing the advertisement information registering unit 211, the advertisement information updating unit 212, the detailed information referring unit 213, the display controlling unit 214-1 to 214-*n*, and the reservation request sending/receiving unit 215 on the computer.

The information portable unit 4*a* is different from the information portable unit 4 shown in FIG. 1 in that it is provided with the detailed information requesting unit 43*a* including the reservation requesting unit 45, instead of the detailed information requesting unit 43. The detailed information requesting unit 43*a* is realized by a micro processor and a storing medium such as a disk or a semiconductor memory storing a program for working the micro processor as the detailed information requesting unit 43*a*. The program stored in the storing medium is read out by the micro processor, so to control the operation of the micro processor, thereby realizing the detailed information requesting unit 43*a* including the reservation requesting unit 45 on the micro processor.

The reservation requesting unit 45 has a function of sending the reservation requesting information to the advertisement panel system through the sending/receiving unit 44 by wireless communication, according to a user's instruction.

This time, the operation of the embodiment will be described. The operation at a time of registering the advertisement information, updating the advertisement information, and referring to the detailed information is similar to that of the above mentioned first embodiment, and only the operation at a time of reservation will be described here.

For example, assume that a user carrying the information portable unit 4*a* shows the reservation state of the detailed information of the restaurant A where the shop terminal 1-1*a* is set, on the display unit 41, by using the advertisement panel system 3-1. Watching the reservation state, the user confirms that there is a vacancy in a desired time zone, and then operates the operation unit 42 so to activate the reservation requesting unit 45.

Figure 13:
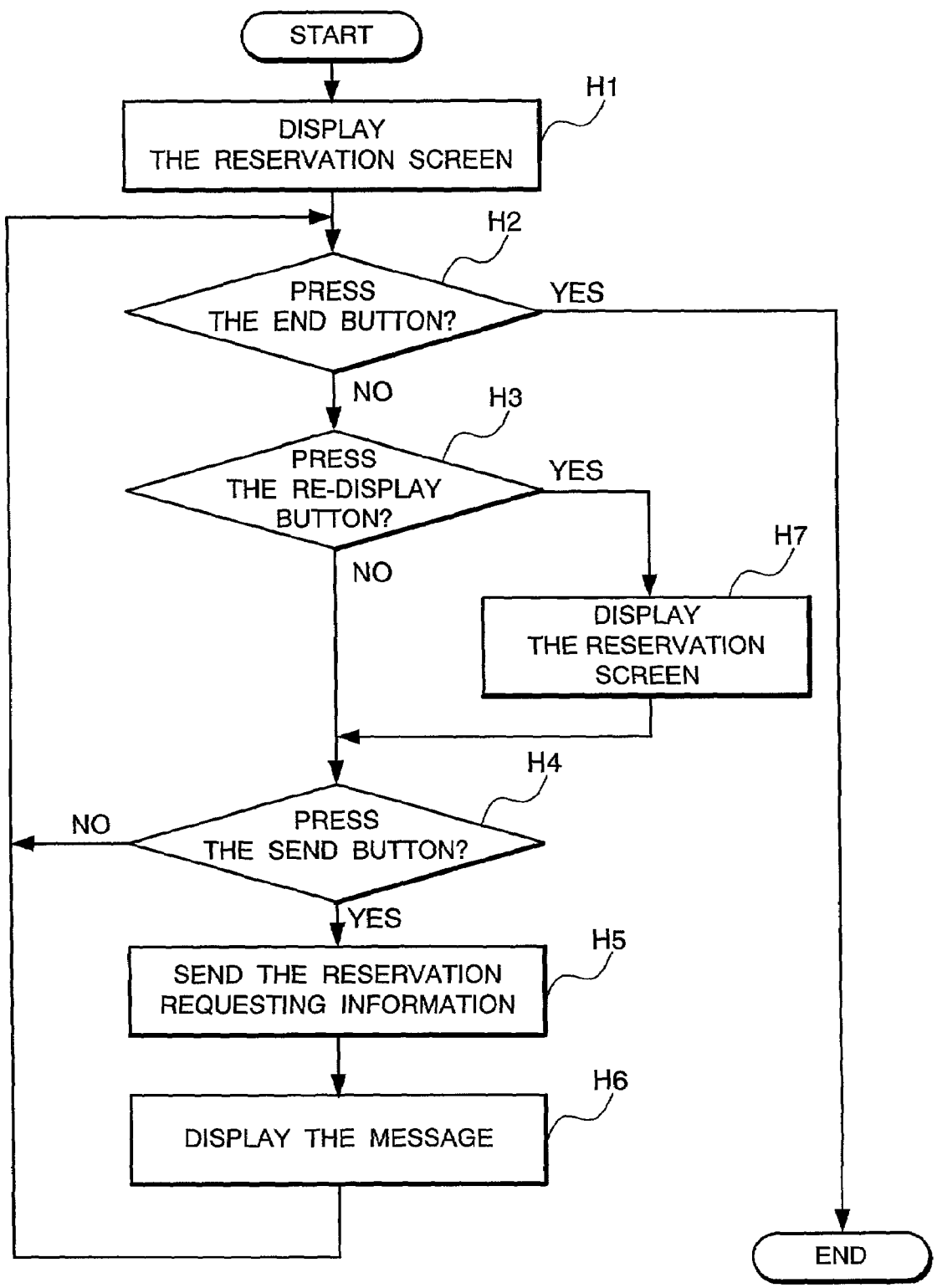
FIG. 13 is a flow chart showing a processing example of a reservation requesting unit 45.

The reservation requesting unit 45 displays the reservation screen as shown in FIG. 14 on the display unit 41 (Step H1 in FIG. 13). This reservation screen contains the reservation state (the content is the same as at a reference), an input column of the reservation indispensable items, a message display column, an end button, a send button, and re-display button.

When the reservation screen is displayed, the user operates the operation unit 42 so as to enter the name, the number of people, and the phone number into the input column of the reservation indispensable items corresponding to the desired time zone. In the example of FIG. 14, the name "Yamada", the number of people "four", and the phone number "00-1111-2222" are filled in the input column of the reservation indispensable items corresponding to the time zone 19:00 to 21:00 on March 31. When finishing the input of the reservation indispensable items, the user presses the send button.

Thus, the reservation requesting unit 45 sends the reservation requesting information including the reservation time zone "19:00 to 21:00 on March 31", the name "Yamada", the number of people "four", and the phone number "00-1111-2222" to the advertisement panel system through the sending/receiving unit 44 (YES in Steps H4, H5).

Figure 15:
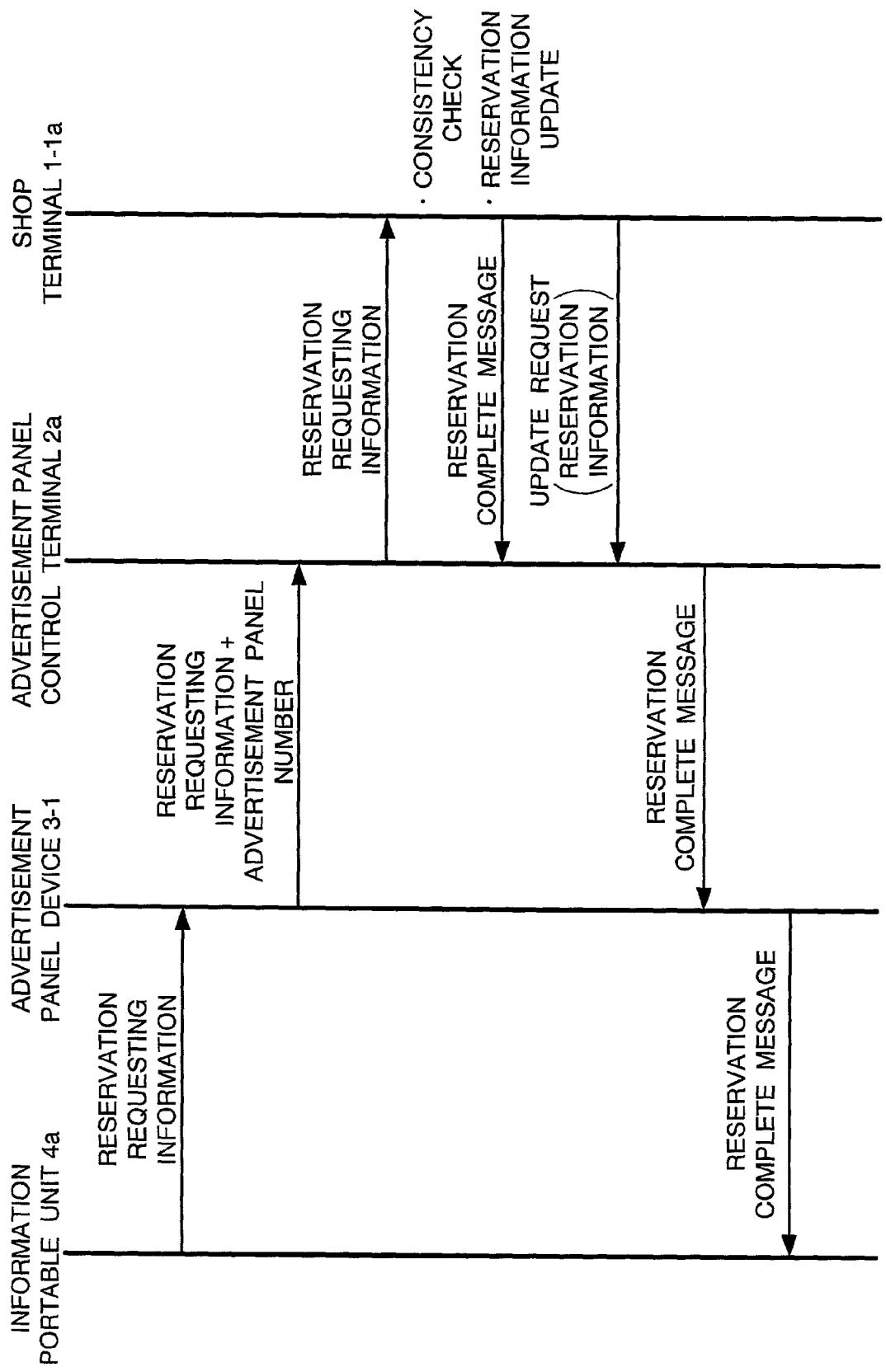
FIG. 15 is a view showing the information to be exchanged at a reservation.

This reservation requesting information is sent to the advertisement panel system 3-1 as shown in FIG. 15. Upon receipt of the reservation requesting information, the sending/receiving unit for portable unit 31-1 within the advertisement panel system 3-1 adds the advertisement panel number "001", attached on the own advertisement panel system 3-1, to the same information, and sends it to the advertisement panel control terminal 2a.

The reservation request sending/receiving unit 215 within the advertisement panel control terminal 2a sends the reservation requesting information sent from the advertisement panel system 3-1, to the shop terminal 1-1a corresponding to the advertisement panel number "001" through the communication network 5, as shown in FIG. 15.

Figure 16:
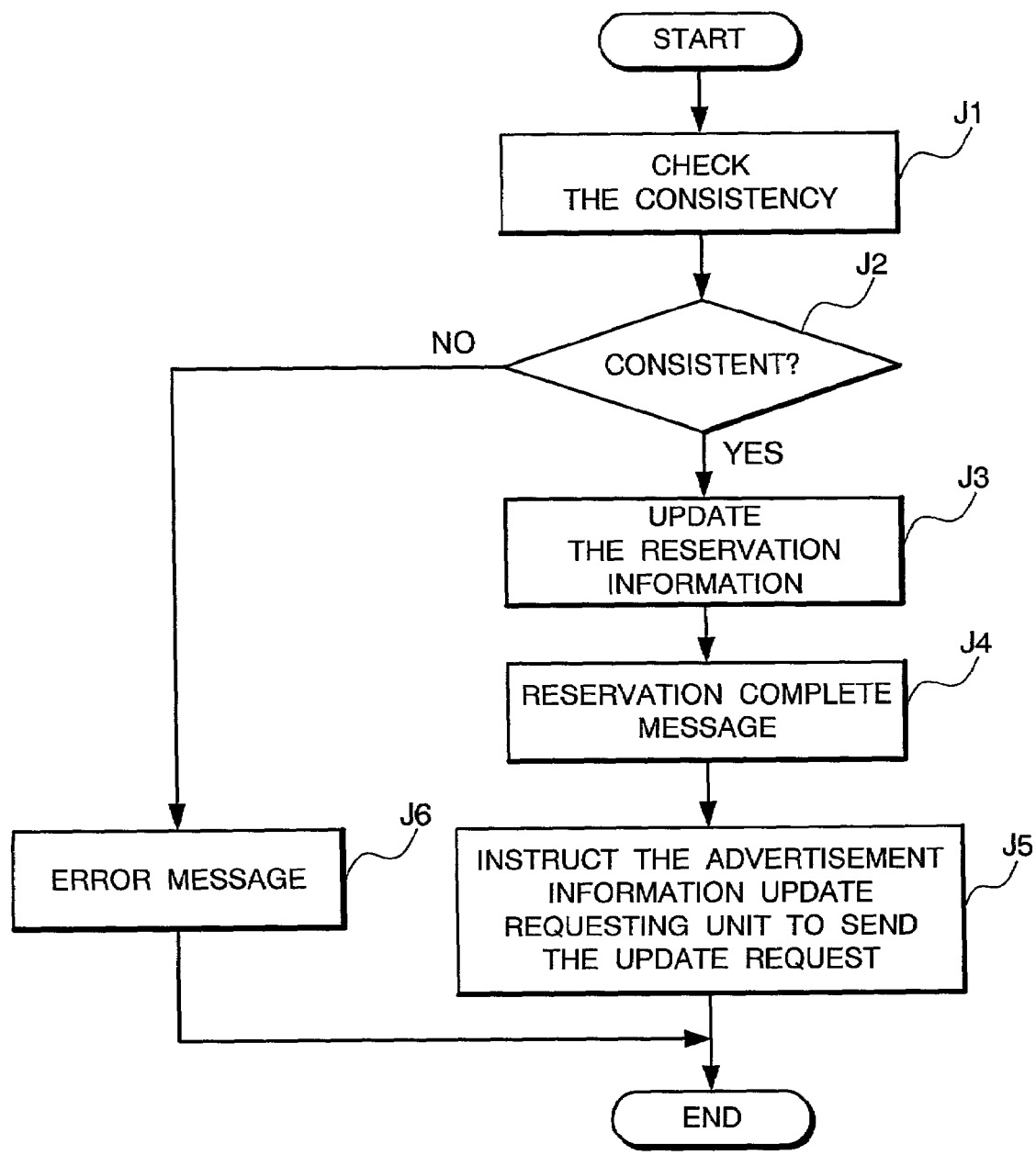
FIG. 16 is a flow chart showing a processing example of each reservation controlling unit 15-1 to 15-$n$.

Upon receipt of the reservation requesting information, the reservation controlling unit 15-1 within the shop terminal 1-1a checks the consistency of the same information (whether the number of the reserved people is within the number of the vacancies or not) (Step J1 in FIG. 16).

When it is consistent (YES in Step J2), the reservation information stored in the reservation information file is updated according to the received reservation requesting information (Step J3). Thereafter, the reservation controlling unit 15-1 sends the reservation complete message to the advertisement panel control terminal 2a through the communication network 5, and further instructs the advertisement information update requesting unit 12-1a to send the update request (Steps J4, J5). Thus, the advertisement information update requesting unit 12-1a sends the update request including the content of the above reservation information file to the advertisement panel control terminal 2a through the communication network 5.

When it is not consistent (NO in J2), the reservation controlling unit 15-1 sends an error message to the advertisement panel control terminal 2a through the communication network 5 (Step J6).

When receiving the reservation complete message or the error message from the shop terminal 1-1a, the reservation request sending/receiving unit 215 within the advertisement panel control terminal 2a passes it to the advertisement panel system 3-1, and the advertisement information updating unit 212 updates the reservation information about the shop terminal 1-1a registered in the advertisement information storing unit 22, upon receipt of the update request of the reservation information from the shop terminal 1-1a.

Upon receipt of the reservation complete message or the error message from the advertisement panel control terminal 2a, the sending/receiving unit for portable unit 31-1 within the advertisement panel system 3-1 sends it to the information portable unit 4a.

When the sending/receiving unit 44 receives the reservation complete message or the error message, the reservation requesting unit 45 within the information portable unit 4a displays it in the message display column on the reservation screen (Step H6 in FIG. 13).

When the reservation complete message is displayed on the message display column, a user presses the end button, so to finish the processing (Step H2). When the error message is displayed, a user presses the re-display button. Thus, the reservation requesting unit 45 displays the reservation screen on the display unit 41 again (YES in Steps H3, H7). When the reservation screen is displayed again, he or she uses it so as to make a reservation again.

First, the present invention can update an advertisement image immediately and lessen the burden of an advertiser. This is because the advertisement information is to be registered and updated through the communication network, and therefore an advertiser does not need to go to a setting place of the advertisement panel system.

Second, it can display the content of an update advertisement without imposing much load on a communication network. This is because the advertisement information is stored in the advertisement control terminal and the communication network is used only at a time of updating the content.

Third, it can present not only an advertisement image but also the detailed information such as a map for introducing a shop in detail, reservation state, and the like to a user. This is because the information portable unit carried by a user is provided with the detailed information requesting unit and the advertisement panel system is provided with the sending/receiving unit for portable unit, thereby exchanging the detailed information reference request and the detailed information between the information portable unit and the advertisement panel control terminal through the advertisement panel system.

Fourth, it can make an effective advertisement taking the focus on the consumers comparatively in the neighborhood of a shop. This is because it can provide the attractive visual image information and the detailed information of the update content depending on a necessity in their combination.

Fifth, it enables an advertiser to get necessary information for the future commercial activities. This is because the access history to the detailed information is to be stored.

Sixth, it enables a user to make a reservation at ease. This is because the reservation requesting unit, the sending/receiving unit for portable unit, the reservation request sending/receiving unit, and the reservation controlling unit are respectively provided with the information portable unit, the advertisement panel system, the advertisement panel control terminal, and the shop terminal, thereby making it possible to send the reservation requesting information from the information portable unit to the shop terminal through the advertisement panel system, the advertisement panel control terminal, and the communication network.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A system, comprising:

a plurality of shop terminals;

an advertisement panel control terminal connected with the plurality of shop terminals through a communication network; and a plurality of advertisement panel devices;

wherein each shop terminal of said plurality of shop terminals is configured to send, to the advertisement panel control terminal through the communication network, respective advertisement information;

wherein said advertisement panel control terminal is configured to determine, for the respective advertisement information received from each shop terminal of the plurality of shop terminals, a corresponding advertisement panel device of said plurality of advertisement panel devices on which at least a portion of said respective advertisement information is to be displayed based on corresponding control information that is in correspondence with said respective advertisement information;

wherein said advertisement panel control terminal is configured to control, for the respective advertisement information received from each shop terminal of the plurality of shop terminals, the corresponding advertisement panel device to display at least the portion of the respective advertisement information;

wherein said advertisement panel control terminal is configured to send, when a particular advertisement panel device of the plurality of advertisement panel devices makes a request for particular detailed information, the particular detailed information to the particular advertisement panel device;

wherein the particular advertisement panel device is configured to send, upon receipt of a reference request for the particular detailed information from an information portable unit, the request for the particular detailed information to the advertisement panel control terminal, and is configured to send the particular detailed information received from the advertisement panel control terminal to said information portable unit;

wherein said particular detailed information includes reservation information indicating a reservation state;

wherein said particular advertisement panel device is configured to receive reservation requesting information from the information portable unit;

wherein said particular advertisement panel device is configured to send the reservation requesting information to the advertisement panel control terminal upon receipt of the reservation requesting information from the information portable unit;

wherein said advertisement panel control terminal is configured to send the reservation requesting information received from said particular advertisement panel device to a particular shop terminal of said plurality of shop terminals corresponding to the reservation requesting information; and wherein said particular shop terminal comprises a reservation controlling unit for controlling the reservation information indicating the reservation state and for updating the reservation information based on the reservation requesting information.

2. The system of claim 1, wherein each shop terminal of said plurality of shop terminals comprises an advertisement information update requesting unit for requesting, through the communication network, the advertisement panel control terminal to update the respective advertisement information; and wherein said advertisement panel control terminal comprises an advertisement information updating unit for updating the respective advertisement information corresponding to a specific shop terminal of said plurality of shop terminals having made an update request, according to the update request of the respective advertisement information from the specific shop terminal.

3. The system of claim 1, wherein said advertisement panel control terminal is configured to add the corresponding control information to the respective advertisement information sent from each shop terminal of said plurality of shop terminals, and is configured to store both the respective advertisement information and the corresponding control information into an advertisement information storing unit.

4. The system of claim 1, wherein said particular detailed information further includes of a plurality of items;

wherein said advertisement panel control terminal is configured to send an item list with the plurality of items of the particular detailed information to the particular advertisement panel device when the request for the particular detailed information is made by the particular advertisement panel device, and is configured to send a content of an item of said plurality of items to the particular advertisement panel device when an item name of the item in the item list is notified to the advertisement panel control terminal by the particular advertisement panel device, and wherein said particular advertisement panel device is configured to send said item list to said information portable unit upon receipt of the item list from the advertisement panel control terminal, and is configured to notify the item name to said advertisement panel control terminal upon receipt of the item name from said information portable unit, and is configured to send the content of the item received from said advertisement panel control terminal to said information portable unit.

5. The system of claim 4, wherein the system further includes said information portable unit; and wherein said information portable unit is configured to display the item list upon receipt of the item list, and is configured to send the item name of the item specified by a user to the particular advertisement panel device, and is configured to display the content of the item received from the particular advertisement panel device.

6. The system of claim 4, wherein said advertisement panel control terminal comprises an access history storing unit for storing an access history indicating a respective access state of each item of the plurality of items of the particular detailed information; and wherein said advertisement panel control terminal is configured to update the access history stored in said access history storing unit based on the item name notified from the particular advertisement panel device.

7. A method in a system, said system having a plurality of shop terminals, an advertisement panel control terminal connected with the plurality of shop terminals through a communication network, and a plurality of advertisement panel devices, said method comprising:

sending, from each shop terminal of the plurality of shop terminals to the advertisement panel control terminal through the communication network, respective advertisement information;

receiving, by the advertisement panel control terminal from each shop terminal of the plurality of shop terminals, the respective advertisement information;

determining, by the advertisement panel control terminal for the respective advertisement information received from each shop terminal of the plurality of shop terminals based on corresponding control information that is in correspondence with said respective advertisement information, a corresponding advertisement panel device of said plurality of advertisement panel devices on which at least a portion of the respective advertisement information is to be displayed;

sending, by the advertisement panel control terminal for the respective advertisement information received from each shop terminal of the plurality of shop terminals, the respective advertisement information to the corresponding advertisement panel device; and sending, by the advertisement panel control terminal when a particular advertisement panel device of the plurality of advertisement panel devices makes a request for particular detailed information, the particular detailed information to the particular advertisement panel device having made the request;

displaying, by said particular advertisement panel device, at least a portion of particular advertisement information received from the advertisement panel control terminal;

sending, by said particular advertisement panel device upon receipt of a reference request for the particular detailed information from an information portable unit, the request for the particular detailed information to the advertisement panel control terminal;

sending, by said particular advertisement panel device, the particular detailed information received from the advertisement panel control terminal to said information portable unit, said particular detailed information including reservation information indicating a reservation state;

receiving, by said particular advertisement panel device, reservation requesting information from said information portable unit;

sending, by said particular advertisement panel device, the reservation requesting information to the advertisement panel control terminal upon receipt of the reservation requesting information from said information portable unit;

sending, by said advertisement panel control terminal, the reservation requesting information received from the particular advertisement panel device to a particular shop terminal of said plurality of shop terminals corresponding to the reservation requesting information; and updating, by said particular shop terminal, the reservation information based on the reservation requesting information.

8. The method of claim 7, further comprising:

requesting, by each shop terminal of the plurality of shop terminals through the communication network, the advertisement panel control terminal to update the respective advertisement information; and updating, by said advertisement panel control terminal, the respective advertisement information corresponding to a specific shop terminal of said plurality of shop terminals having made an update request, according to the update request of the respective advertisement information from the specific shop terminal.

9. The method of claim 7, further comprising:

adding, by said advertisement panel control terminal, the corresponding control information to the respective advertisement information sent from each shop terminal of said plurality of shop terminals, and storing both the respective advertisement information and the corresponding control information therein.

10. The method of claim 7, wherein said particular detailed information further includes a plurality of items; and wherein said method further comprises:

sending, from said advertisement panel control terminal, an item list with the plurality of items of the particular detailed information to the particular advertisement panel device when the request for the particular detailed information is made by the particular advertisement panel device;

sending, from said advertisement panel control terminal, a content of an item of said plurality of items to the particular advertisement panel device when an item name of the item in the item list is notified to the advertisement panel control terminal by the particular advertisement panel device;

sending, from said particular advertisement panel device, said item list to said information portable unit upon receipt of the item list from the advertisement panel control terminal;

notifying, by said particular advertisement panel device, the item name to the advertisement panel control terminal upon receipt of the item name from said information portable unit; and sending, from said particular advertisement panel device, the content of the item received from the advertisement panel control terminal to said information portable unit.

11. The method of claim 10, wherein the system further includes said information portable unit; and wherein the method further includes:

displaying, by said information portable unit, the item list upon receipt of the item list;

sending, by said information portable unit, the item name of the item specified by a user to the particular advertisement panel device; and receiving and displaying, by said information portable unit, the content of the item sent from the particular advertisement panel device.

12. The method of claim 10, further comprising:
storing, by said advertisement panel control terminal, an access history indicating a respective access state of each item of said plurality of items; and
updating, by said advertisement panel control terminal, the access history based on the item name notified from the particular advertisement panel device.

13. A computer readable memory storing a program for controlling a system to perform a process, said system having a plurality of shop terminals, an advertisement panel control terminal connected with the plurality of shop terminals through a communication network, and a plurality of advertisement panel devices, said process comprising:
sending, from each shop terminal of the plurality of shop terminals to the advertisement panel control terminal through the communication network, respective advertisement information;
receiving, by the advertisement panel control terminal from each shop terminal of the plurality of shop terminals, the respective advertisement information;
determining, by the advertisement panel control terminal for the respective advertisement information received from each shop terminal of the plurality of shop terminals based on corresponding control information that is in correspondence with said respective advertisement information, a corresponding advertisement panel device of said plurality of advertisement panel devices on which at least a portion of the respective advertisement information is to be displayed;
sending, by the advertisement panel control terminal for the respective advertisement information received from each shop terminal of the plurality of shop terminals, the respective advertisement information to the corresponding advertisement panel device;
sending, by the advertisement panel control terminal when a particular advertisement panel device of the plurality of advertisement panel devices makes a request for particular detailed information, the particular detailed information to the particular advertisement panel device having made the request;
displaying, by said particular advertisement panel device, at least a portion of particular advertisement information received from the advertisement panel control terminal;
sending, by said particular advertisement panel device upon receipt of a reference request for the particular detailed information from an information portable unit, the request for the particular detailed information to the advertisement panel control terminal;
sending, by said particular advertisement panel device, the particular detailed information received from the advertisement panel control terminal to said information portable unit, said particular detailed information including reservation information indicating a reservation state;
receiving, by said particular advertisement panel device, reservation requesting information from said information portable unit;
sending, by said particular advertisement panel device, the reservation requesting information to the advertisement panel control terminal upon receipt of the reservation requesting information from said information portable unit;
sending, by said advertisement panel control terminal, the reservation requesting information received from the particular advertisement panel device to a particular shop terminal of said plurality of shop terminals corresponding to the reservation requesting information;
controlling, by said particular shop terminal, the reservation information indicating the reservation state; and
updating, by said particular shop terminal, the reservation information based on the reservation requesting information.

14. The computer readable memory of claim 13, wherein said process further comprises:
requesting, by each shop terminal of the plurality of shop terminals through the communication network, the advertisement panel control terminal to update the respective advertisement information; and
updating, by said advertisement panel control terminal, the respective advertisement information corresponding to a specific shop terminal of said plurality of shop terminals having made an update request, according to the update request of the respective advertisement information from the specific shop terminal.

15. The computer readable memory of claim 13, wherein said process further comprises:
adding, by said advertisement panel control terminal, the corresponding control information to the respective advertisement information sent from each shop terminal of said plurality of shop terminals, and storing both the respective advertisement information and the corresponding control information therein.

16. The computer readable memory of claim 13,
wherein said particular detailed information further includes of a plurality of items; and
wherein said process further comprises:
sending, from said advertisement panel control terminal, an item list with the plurality of items of the particular detailed information to the particular advertisement panel device when the request for the particular detailed information is made by the particular advertisement panel device;
sending, from said advertisement panel control terminal, a content of an item of said plurality of items to the particular advertisement panel device when an item name of the item in the item list is notified to the advertisement panel control terminal by the particular advertisement panel device;
sending, from said particular advertisement panel device, said item list to said information portable unit upon receipt of the item list from the advertisement panel control terminal;
notifying, by said particular advertisement panel device, said item name to the advertisement panel control terminal upon receipt of the item name from said information portable unit; and
sending, from said particular advertisement panel device, the content of the item received from the advertisement panel control terminal to said information portable unit.

17. The computer readable memory of claim 16,
wherein the system further includes said information portable unit; and
wherein the process further comprises:
displaying, by said information portable unit, the item list upon receipt of the item list from the particular advertisement panel device;

sending, by said information portable unit, the item name of the item specified by a user to the particular advertisement panel devices; and receiving and displaying, by said information portable unit, the content of the item sent from the particular advertisement panel device.

18. The computer readable memory of claim 16, said process further comprising:

storing, by said advertisement panel control terminal, an access history indicating a respective access state of each item of said plurality of items; and updating, by said advertisement panel control terminal, the access history based on the item name notified from the particular advertisement panel device.

* * * * *